United States Patent Office 2,702,697
Patented Feb. 22, 1955

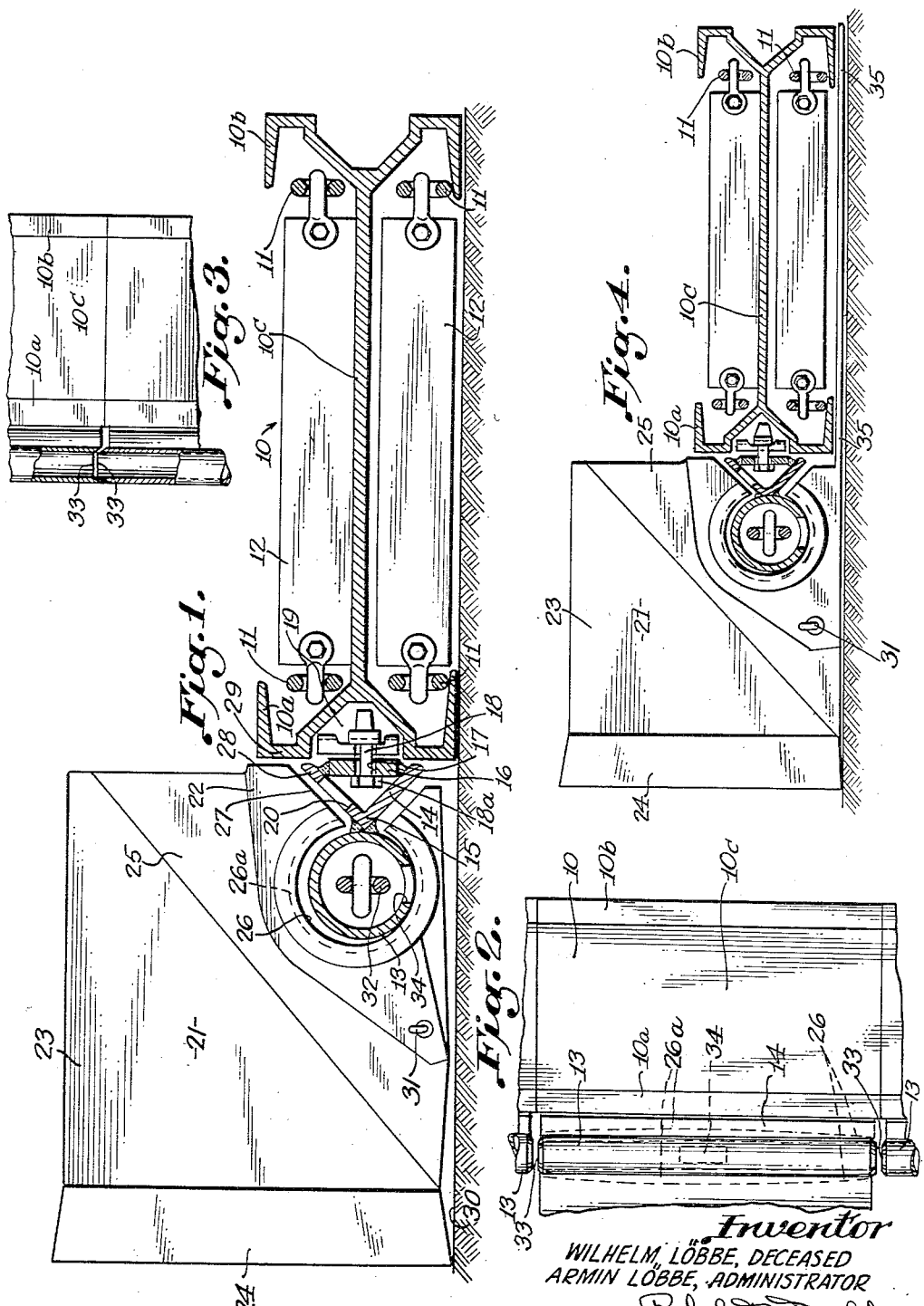

2,702,697

GUIDE MEANS FOR PLOW-TYPE CUTTERHEAD

Wilhelm Löbbe, deceased, late of Oberaden, Germany, by Armin Löbbe, administrator, Oberaden, Germany Application April 6, 1950, Serial No. 154,413

Claims priority, application Germany April 30, 1949

9 Claims. (Cl. 262—8)

The present invention relates to a conveyor having a stationary trough and carrying on its side facing the coal face, a section rail on which a coal planing tool is guided. The planer is drawn along the coal face by the aid of a cable or a chain whereby in this way, it automatically loosens a narrow strip of coal from the seam and simultaneously loads the loosened coal into the conveyor.

According to the invention the guide rail which is arranged on the conveyor for guiding the planer is formed as a hollow rail, and the return of a chain used for towing the planer is carried out through the interior of the rail. The guide rail is conveniently constructed as a cylindrical tube one side of which is rigidly attached as by welding to a fixed section, such as an angle section, which is secured to the side section of the conveyor. The tubular guide section and the fixing section welded thereon, are split up into separate sections which correspond approximately to the length of the separate trough sections into which the conveyor is divided. A small space may be provided between the successive tube sections at the abutment points. The sections may, however, engage one within the other, one section being slightly tapered and the next succeeding section being slightly flared. It is not desirable to have the ends of the two tubes sections abutting rigidly one against the other, because it would hinder the lateral swinging of the trough cable.

The planer chain runs unimpeded and with the smallest possible friction in the interior of the hollow guide section or tube from the reversing station back to the driving station. It has been shown that towing of the return run of the chain directly on the floor necessitates a considerable power output which is only slightly less than the power taken by the cutting tool or planer.

It is not possible to prevent small quantities of fine coal occasionally penetrating into the interior of the tube at the adjoining ends of the individual sections. These are not obstructive and under certain circumstances reduce the sliding resistance in the dragging of the chain. In order to prevent the accumulation of relatively large amounts of fine coal in the guide tube, the latter is provided at certain intervals on its lower portion with apertures through which the small coal can fall out again. Relatively large amounts of coal in the tube might lead to the jamming of the chain.

The guide beam of the planer, which in known manner rises at its end faces and on its side directed towards the coal face, is provided with a longitudinal guide channel which embraces the tubular guide of the trough over more than half its periphery. In this way, the planer is properly guided both in the vertical and in the horizontal plane. In order to prevent the tipping of the planer about the hollow guide section as a pivot, the guide beam may be provided with one or more plate-like projections which engage under the conveyor, conveniently over its entire width, and which, when the planer is drawn forwards, slides forward between the floor and the underside of the trough.

The turning movement of the planer, may however, also be prevented by the planer itself being provided with shoulder-like slide surfaces which are supported against a corresponding slide surface on the fixing section or on the trough side section.

In certain cases, it is only necessary for the guide beam of the planer to engage around the tubular guide at its ends, whilst a substantially greater clearance is provided between the guide tube and the beam over the part of its length between its ends. In this construction, the planer obviously is guided even when it moves over depressions and ridges, and with a conveyor which is not directed absolutely straight in the horizontal direction.

One constructional embodiment of the invention is shown, by way of example, in the accompanying drawing, wherein:

Fig. 1 is a section through the conveyor and the hollow guide rail,

Fig. 2 is a corresponding plan view in which, for purposes of clarity, the driving band is omitted.

Fig. 3 shows the tubular guide rails according to one embodiment of the invention, having one end flared and the other tapered; and Fig. 4 is a section similar to Fig. 1 and shows a guide beam provided with plate-like projections to steady the planer.

Referring to the drawings:

The conveyor 10 comprises two side sections 10a and 10b which are interconnected at about half their height by the conveyor bottom 10c. The conveying action is effected above the conveyor bottom or base 10c by the laterally arranged drag chains 11 which are connected to one another by the driver or scraper elements 12. The return run of the driving band 11, 12 takes place underneath the base 10c of the conveyor.

Arranged on the side of the conveyor which is directed towards the coal face is a tubular guide section 13 for a coal planing tool. As can be clearly seen in Fig. 2, the tubular guide 13 consists of separate tube sections, the length of each of which corresponds approximately to that of the sections of the conveyor trough 10. Each tube section 13 has a welded joint with a longitudinal edge of an angle section 14, for example, with a right-angled edge 15, as shown in the construction illustrated. Flat iron members 16 provided with bores 17 are welded at intervals in between the free limbs of the angle rail 14. Engaging through the bores 17 are fixing screws 18 which are anchored in a lateral recess 19 in the trough side section 10a. The nuts 18a of the screws 18 are accessible through the openings 20 in the upwardly directed limb of the angle-section rail.

The planer 21 consists of an extended guide beam 22 on which is arranged the support 23 which carries a cutter 24 at each of its front and rear ends and which is oscillatable over a limited angle. The guide beam 22 rises at an inclination at its two ends and laterally and, similarly, the surfaces 25 and 23 also rise at an inclination, so that as the planer 21 is moved forward, the loosened coal is pushed upwards and passes over the side section 10a into the conveyor 10.

The guide beam 22 is penetrated longitudinally by a guide channel 26 which is open on its side facing the conveyor 10 and which is of circular cross-section to correspond to the section of the tube 13 which it embraces over more than half its periphery. The guide 26 of the beam 22, however, embraces the tube 13 comparatively tightly only at its ends and towards the centre, it is expanded substantially, as indicated by the dotted line 26a in Fig. 1 and can best be seen in Fig. 2. The planer 21 or the planer beam 22, is supported by a shoulder 27 and the vertical surface above it bearing respectively on the inclined upper surface 28 of the angle-section rail 14 and the lateral surface 29 of the trough side section 10a. By this support between the angularly disposed surfaces of the planer, on the one hand, and the surfaces 28, 29 of the stationary trough, on the other hand, twisting of the planer 21, in such manner that the cutter 24 cuts into the floor 30 at its bottom edge, is prevented. In order to provide for the planer 21 with its cutter 24 to travel directly along the floor under all conditions, it is convenient to arrange for the planer to be supported at the surfaces 28 and 29 before the cutter 24 is raised from the floor. The planer 21 is advanced along the conveyor 10 in known manner by a chain attached to a hook 31. The guiding back of the chain 32 takes place through the guide tube 13.

The individual tube sections are somewhat shorter than the trough sections 10. Whereas the latter overlap one another in the manner of roofing tiles, the tube sections ends 33 are opposite one another with a slight spacing. At these points small quantities of fine coal can penetrate into the tube guide, and they are able to fall out again through the apertures 34 arranged on the underside of the tube 13.

The tube ends 33 may be joined together by having one end slightly flared and the corresponding end slightly tapered so the two ends interlock as shown in Fig. 3.

The planer may also be guided and pivoting prevented by providing the guide beam with one or more plate-like projections which engage under the conveyor and which when the planer is drawn forward, slide forward between the floor and the underside of the trough, as shown in Fig. 4. In this figure the plate-like projections are designated 35.

What is claimed is:

1. In a mining machine having a planing tool pulled back and forth across the mine face by means of a flexible towing element and guided in front of a conveyor having a stationary trough, the improvement in the planer guide means which comprises a horizontally extending tubular guide rail mounted in front of the forward side section of the conveyor, and a planing tool guide beam with said planing tool mounted thereon, said planing tool guide beam defining a horizontally extending tubular opening therethrough positioned with said guide rail extending through said tubular opening with said guide beam encircling a major portion of said guide rail in sliding engagement therewith said flexible towing element being attached for pulling the guide beam and planing tool between the cutting edge of the planing tool and said horizontally extending tubular opening.

2. Improvement according to claim 1 in which said tubular guide rail is a cylindrical tube welded on one side of an angle section rail, the other side of said angle section rail being secured to the forward portion of the forward side section of said stationary trough.

3. Improvement according to claim 2 in which said guide rail is welded to the apex of the angle section rail, the free limbs of said angle section rail being secured to the side section of said stationary trough.

4. Improvement according to claim 3 in which said angle section rail is secured to the side section of the conveyor by means of flat iron members welded at intervals between the limbs of the said angle section rails, said flat iron members being bolted to said conveyor side section.

5. Improvement according to claim 1 in which said tubular guide rail is collectively defined by multiple guide rail sections each attached to a section of said stationary trough, each section being substantially of the same length as the section of the stationary trough to which it is attached.

6. Improvement according to claim 1 in which said tubular guide rail defines at least one aperture through the bottom thereof for the passage of foreign particles.

7. Improvement according to claim 1 in which said tubular opening defined through said guide beam is wider at its center than its ends, the ends being in sliding engagement with said hollow guide rail.

8. Improvement according to claim 1 in which the planing tool has a supporting shoulder attached thereto, said shoulder being in supporting sliding contact with a shoulder bearing surface positioned on the side section of said stationary trough.

9. Improvement according to claim 1, in which said flexible towing element extends from each side of the planing tool along the conveyor and returns in back of the planing tool positioned within said tubular guide rail.

References Cited in the file of this patent

UNITED STATES PATENTS

| 2,286,602 | Cotchett | June 16, 1942 |

FOREIGN PATENTS

| 642,686 | Germany | Mar. 12, 1937 |
| 900,582 | France | Oct. 9, 1944 |